US012502127B2

(12) United States Patent
Georgakopoulos et al.

(10) Patent No.: US 12,502,127 B2
(45) Date of Patent: Dec. 23, 2025

(54) EXTERNAL BAROREFLEX ACTIVATION FOR ASSESSMENT AND TREATMENT

(71) Applicant: CVRx, Inc., Minneapolis, MN (US)

(72) Inventors: Dimitrios Georgakopoulos, Plymouth, MN (US); Ivana Stojanovic, Los Angeles, CA (US); Nadim Yared, Sunrise, FL (US)

(73) Assignee: CVRx, Inc., Minneapolis, MN (US)

( * ) Notice: Subject to any disclaimer, the term of this patent is extended or adjusted under 35 U.S.C. 154(b) by 458 days.

(21) Appl. No.: 18/175,279

(22) Filed: Feb. 27, 2023

(65) Prior Publication Data

US 2023/0355170 A1 Nov. 9, 2023

Related U.S. Application Data

(60) Provisional application No. 63/337,692, filed on May 3, 2022.

(51) Int. Cl.
*A61B 5/0205* (2006.01)
*A61B 5/00* (2006.01)

(52) U.S. Cl.
CPC .......... *A61B 5/4836* (2013.01); *A61B 5/0205* (2013.01); *A61B 5/6822* (2013.01); *A61B 5/7282* (2013.01)

(58) Field of Classification Search
None
See application file for complete search history.

(56) References Cited

U.S. PATENT DOCUMENTS

| | | |
|---|---|---|
| 6,522,926 B1 | 2/2003 | Kieval et al. |
| 6,850,801 B2 | 2/2005 | Kieval et al. |
| 6,985,774 B2 | 1/2006 | Kieval et al. |
| 7,480,532 B2 | 1/2009 | Kieval et al. |
| 7,499,747 B2 | 3/2009 | Kieval et al. |
| 7,835,797 B2 | 11/2010 | Rossing et al. |
| 7,840,271 B2 | 11/2010 | Kieval et al. |

(Continued)

FOREIGN PATENT DOCUMENTS

SU 1386199 A1 4/1988

OTHER PUBLICATIONS

Dampney, "Restting of the Baroreflex Control of Sympathetic Vasomotor Activity during Natural Behaviors: Description and Conceptual Model of Central Mechanisms". Frontiers in Neuroscience, Aug. 15, 2017, 8 pgs.

(Continued)

*Primary Examiner* — Ankit D Tejani
(74) *Attorney, Agent, or Firm* — Pauly, DeVries Smith & Deffner LLC

(57) ABSTRACT

Devices, systems and methods for non-invasive modulation of the baroreflex system of a patient. In embodiments, the present disclosure may be used to measure and monitor baroreflex function for diagnostic purposes in patients acutely or chronically to inform and guide medical treatment, assess disease severity, or assess morbidity/mortality risk. In embodiments, the present disclosure may be used to provide non-invasive baroreflex activation therapy acutely or chronically to treat a variety of disease conditions through rebalancing of the sympathetic and parasympathetic limbs of the autonomic nervous system and their connections to higher brain centers.

18 Claims, 9 Drawing Sheets

(56) References Cited

U.S. PATENT DOCUMENTS

| | | | |
|---|---|---|---|
| 8,086,314 | B1 | 12/2011 | Kieval |
| 8,326,430 | B2 | 12/2012 | Georgakopoulos et al. |
| 9,345,877 | B2 | 5/2016 | Pignato et al. |
| 2006/0004417 | A1 | 1/2006 | Rossing et al. |
| 2006/0074453 | A1 | 4/2006 | Kieval et al. |
| 2008/0082137 | A1 | 4/2008 | Kieval et al. |
| 2010/0094332 | A1 | 4/2010 | Willshaw |
| 2012/0289844 | A1* | 11/2012 | Kieval ............... A61N 1/36114 607/9 |
| 2014/0180357 | A1* | 6/2014 | Shuros ............... A61N 1/36117 607/116 |
| 2019/0262212 | A1 | 8/2019 | Schroeder |

OTHER PUBLICATIONS

Dworkin et al, "Central effects of baroreceptor activity in humans: Attenuation of skeletal reflexes and pain perception". Proc. Natl. Acad. Sci., vol. 91, Jul. 1994, pp. 6329-6333.

Natarajan et al., "Heart rate variability with photoplethysmography in 8 million individuals: a cross-sectional study". Lancet Digital Health, vol. 2, Dec. 2020, 8 pgs.

Pinheiro et al., "Noiseless Variable-Pressure Neck Chamber Device to Assess the Carotid Baroreflex Function". Frontiers in Physiology, Jan. 20, 2021, 10 pgs.

Seredynski et al., "Neck Chamber Technique Revisited: Low-Noise Device Delivering Negative and Positive Pressure and Enabling Concomitant Carotid Artery Imaging with Ultrasonography". Frontiers in Physiology, Oct. 5, 2021, 13 pgs.

Kawashima et al., "Baroreceptor Reflex to Neck Suction and Its Modification by Diltiazem in Man". First Department of Internal Medicine, Hyogo College of Medicine, Nishinomiya, Sep. 1988, 9 pgs.

Fadel et al., "Recent insights into carotid baroreflex function in humans using the variable pressure neck chamber". Experimental Physiology, Sep. 2003, 10 pgs.

Cooper et al., "Carotid baroreflex testing using the neck collar device". Clin Auton Res (2009) 19:102-112.

Sopher et al., Abstract of "Autonomic pathophysiology in heart failure: carotid baroreceptor-cardiac reflexes". American Journal of Physiology, Sep. 1990, https://journals.physiology.org/doi/pdf/10.1152/ajpheart.1990.259.3.H689, accessed Jun. 21, 2023, 3 pgs.

Korner et al., Abstract of "'Steady State' properties of the baroreceptor-heart rate reflex in essential hypertension in man". Clinical and Experimental Pharmacology and Physiology, Feb. 1974, https://onlinelibrary.wiley.com/doi/epdf/10.1111/j.1440-1681.1974.tb00528.x, accessed Jun. 21, 2023, 6 pgs.

Cooper V. et al., Carotid Baroreceptor Reflexes in Humas During Orthosttic Stress. Experimental Physiology, Cambridge University Press, May 4, 2004, vol. 87, No. 5, pp. 677-681.

* cited by examiner

Baroreflex Function Curve in Normal and Disease States

Heart Failure

Hypertension

EXTERNAL BAROREFLEX ACTIVATION FOR ASSESSMENT AND TREATMENT

CROSS REFERENCE TO RELATED APPLICATIONS

The present application claims the benefit of U.S. Provisional Patent Application No. 63/337,692, filed May 3, 2022, entitled "External Baroreflex Activation For Assessment And Treatment," the disclosure of which is hereby incorporated by reference in its entirety.

BACKGROUND

The baroreflex system, including baroreceptors, contributes to regulating aspects of cardiovascular function in individuals. Several factors including age, sex, health and environment of an individual may have an effect on baroreflex function (or gain). Abnormalities in baroreflex function are associated with various disease states including hypertension and heart failure, among others. Therefore, assessing baroreflex function can be of importance, and a number of experimental approaches for assessing baroreflex function have been developed.

One such approach to assess baroreflex function has utilized external neck chamber devices to apply positive or negative neck pressure for the selective activation or deactivation, respectively, of baroreceptors in the carotid sinus. Although neck chamber devices have advantages for assessing baroreflex function, such devices have not been widely adopted for clinical or therapeutic uses due to a number of drawbacks.

Early devices were cumbersome and heavy box-like chambers which surrounded the neck of a patient, and were large enough to abut one or more of the patient's shoulders, chest, back, lower jaw and skull. The neck chamber devices were connected to a pressure generator (e.g., pneumatic) capable of positive or negative pressure, although such generators were similarly large and also noisy. Subsequent developments led to neck devices with a somewhat reduced form factor which resembled neck collars, but were still relatively uncomfortable and still coupled to large, loud sources of pressure during operation. In general, prior neck chamber devices or collar devices were restricted to use in academic centers for research studies.

Use of such investigative neck devices has allowed evaluation of baroreflex function by externally applying negative or positive pressure to the carotid sinus region of a patient and measuring the resulting changes in heart rate and blood pressure, among other hemodynamic responses. Baroreceptors are tethered to viscoelastic elements in arterial walls. This coupling of the arterial wall and baroreceptors is altered with age and various disease conditions thus the resultant electrical stimulus which is conveyed to the central nervous system from the baroreceptors can be assessed by externally applying negative or positive pressure to the carotid sinus region and measuring the resulting changes in heart rate and blood pressure.

FIGS. 1A-1D depict results of a number of prior studies. In FIG. 1A, Koch et al. (Koch, E. Die reflektorisL•he Selbststeuerung des KrcisluuJes, edited by B. Kisch. Dresden, Germany: Stoinkopff, 1931) related pressure inputs applied to the carotid sinus to the electrocardiographic R-R interval outputs allows one to derive a sigmoid relation (the "blutdrurckcharacteristik" or blood pressure characteristic) with threshold, linear, and saturation ranges. In FIG. 1B, Fritsch et al. (AJP:260, 1981) generated the curve derived from a healthy volunteer also demonstrating the corresponding changes in diastolic blood pressure and muscle sympathetic activity. FIGS. 1C and 1D demonstrate changes in baroreflex gain curves in hypertensive (Korner P I., Clin Exp Pharm Physiol. 1; 1974) and heart failure (Sopher et al. AJP: 259, 1990) patients, respectively. These studies, among others, has led to the recognition of the baroreflex function/gain as a vital clinical index.

The external application of positive or negative pressure on a carotid sinus of a patient has potential for a number of uses, including diagnostic and therapeutic. Improved devices and methods would be desirable to realize this potential. The present disclosure addresses these concerns.

SUMMARY

The present disclosure provides a number of devices, systems and methods for non-invasive modulation of the baroreflex system of a patient. In embodiments, the present disclosure may be used to measure and monitor baroreflex function in patients acutely or chronically to inform and guide medical treatment, assess disease severity, or assess morbidity/mortality risk. In embodiments, the present disclosure may be used to provide non-invasive baroreflex activation therapy acutely or chronically to treat a variety of disease conditions.

Generally, application of negative pressure to the neck will activate or stimulate baroreceptors, causing a decrease in heart rate and blood pressure. Conversely, application of positive pressure to the neck will deactivate or unload baroreceptors, causing an increase in heart rate and blood pressure. Other hemodynamic responses can include changes in peripheral resistance, venous capacitance and renal function, through modulation of the sympathetic and parasympathetic nervous systems. Elicited hemodynamic responses from the application of pressure on the neck are bi-directional, such that for example blood pressure and heart rate can be increased or decreased dependent on the clinical condition. As a non-limiting example, during hemorrhage or shock, positive pressure can be applied with the neck chamber to restore and stabilize blood pressure and stabilize circulatory function.

In embodiments, aspects of the present disclosure can be used in the home, clinical care settings, first responder units, drone delivery, and other settings where devices such as automated external defibrillators or cardio-pulmonary resuscitation devices can be found. In embodiments, aspects of the present disclosure can be portable, allowing convenient use outside of clinical settings for diagnostic or therapeutic applications.

In embodiments, aspects of the present disclosure can be considered a wearable which provides for routine measurement of baroreflex gain which may become part of a patients' medical record similar to blood pressure, glucose, blood lipids, etc., and which can be used to assess patient disease progression and clinical risk.

In embodiments, aspects of the present disclosure can be used in various disease conditions to deliver therapy by activating or deactivating the baroreflex.

In embodiments, aspects of the present disclosure can utilize advanced electronics, sensors and algorithms to make the device "intelligent" and allow for closed loop control to assess patient status and apply targeted therapy. For example, with the use of one or more sensors for closed loop control to assess patient status and deliver appropriate positive or negative pressure to alleviate symptoms.

BRIEF DESCRIPTION OF THE DRAWINGS

Subject matter hereof may be more completely understood in consideration of the following detailed description of various embodiments in connection with the accompanying figures, in which.

Figures 1A, 1B:
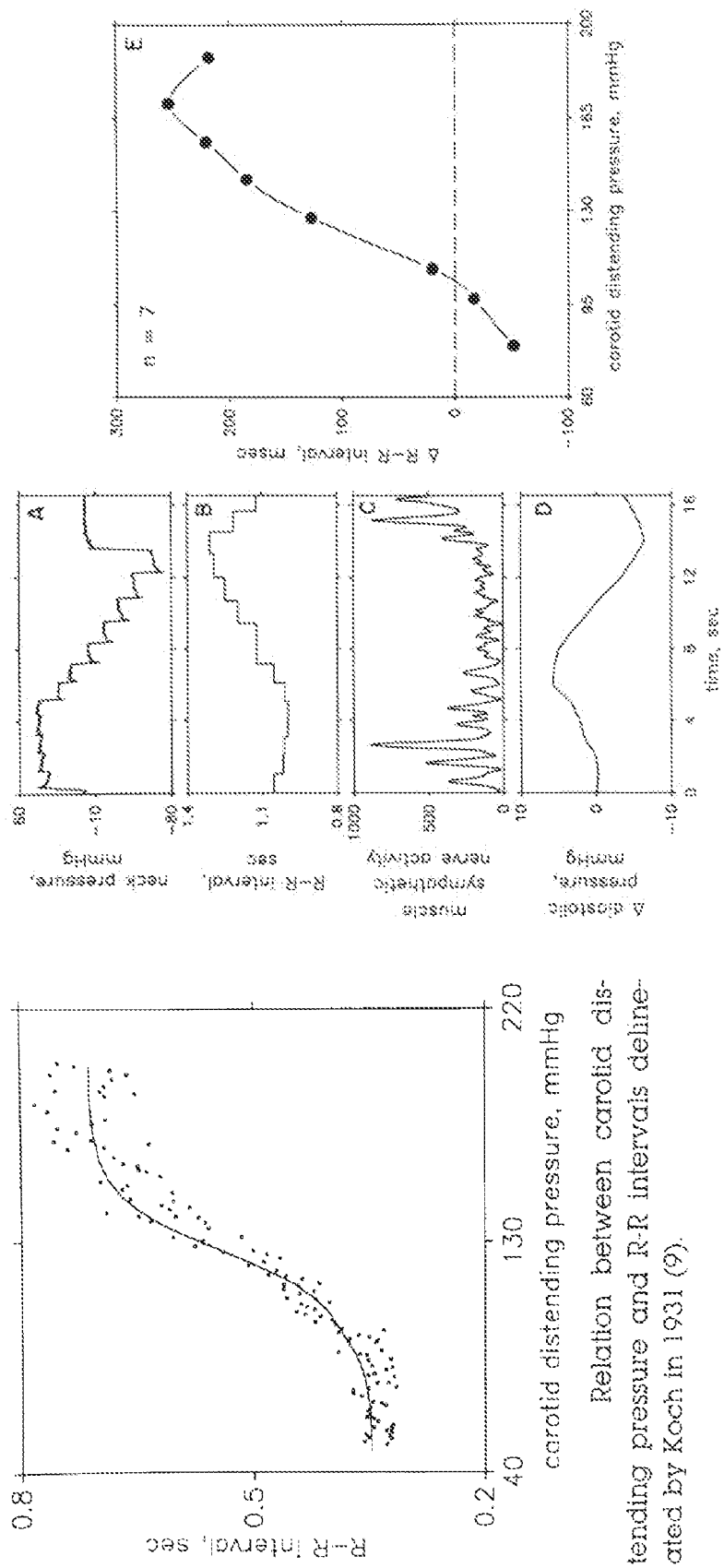
FIGS. 1A-1D are representations of various prior art academic studies.
Figure 1D:
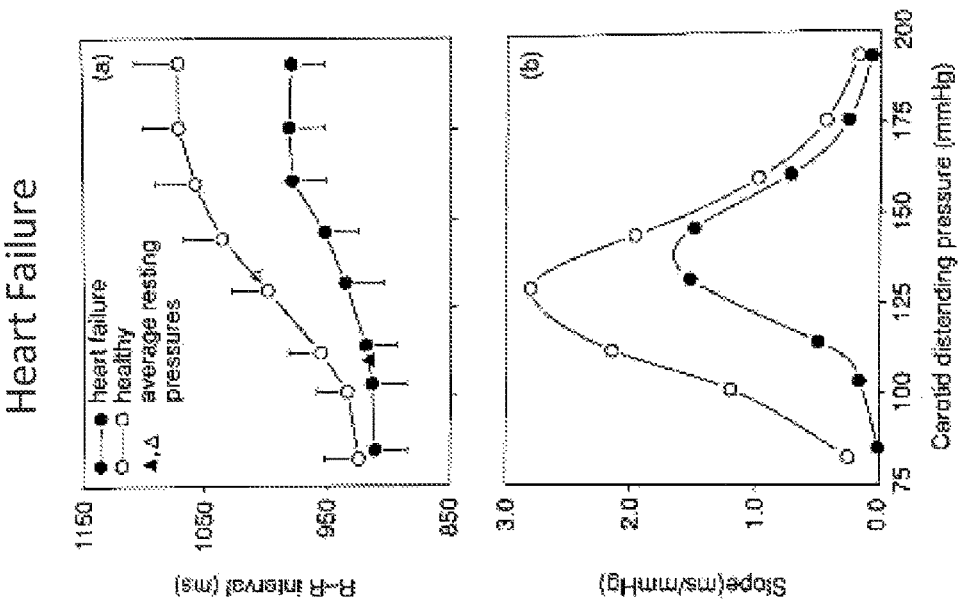
Figure 1C:
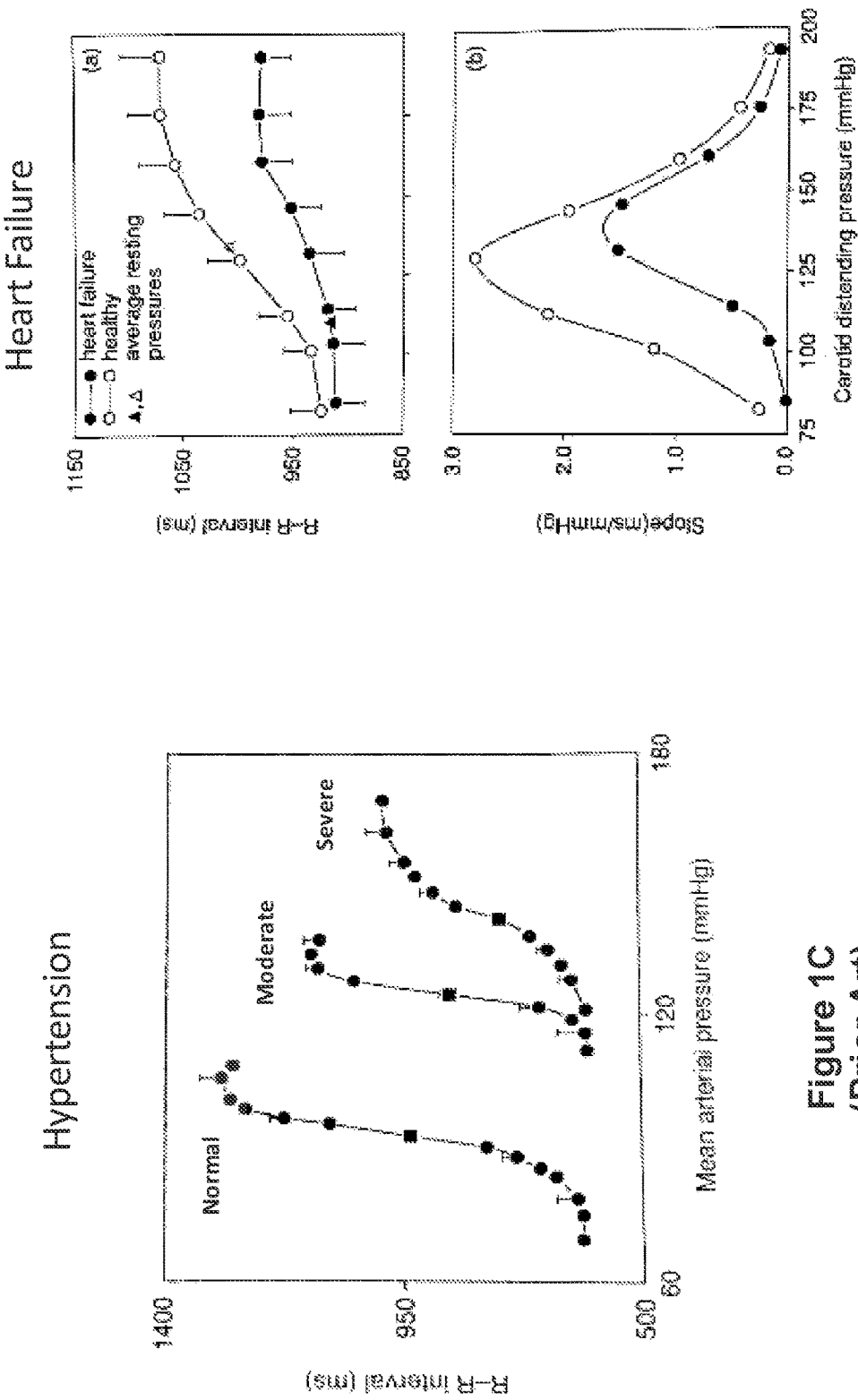

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments described herein generally pertain to the external application of positive or negative pressure on a carotid sinus region of a patient's neck, or proximate thereto, for diagnostic or therapeutic applications, or combinations thereof.

For information pertaining to the cardiovascular, circulatory and nervous systems, as well as baroreceptor and baroreflex therapy systems that may be used in whole or in part with embodiments of the present disclosure, reference is made to the following commonly assigned published applications and patents: U.S. Published Patent Application Nos. 2006/0004417 to Rossing et al., 2006/0074453 to Kieval et al., 2008/0082137 to Kieval et al., and U.S. Pat. No. 6,522,926 to Kieval et al., U.S. Pat. No. 6,850,801 to Kieval et al., U.S. Pat. No. 6,985,774 to Kieval et al., U.S. Pat. No. 7,480,532 to Kieval et al., U.S. Pat. No. 7,499,747 to Kieval et al., U.S. Pat. No. 7,835,797 to Rossing et al., U.S. Pat. No. 7,840,271 to Kieval et al., U.S. Pat. No. 8,086,314 to Kieval, U.S. Pat. No. 8,326,430 to Georgakopoulos et al., and U.S. Pat. No. 9,345,877 to Pignato et al., the disclosures of which are hereby incorporated by reference in their entireties except for the claims and any expressly contradictory definitions.

Figure 2:
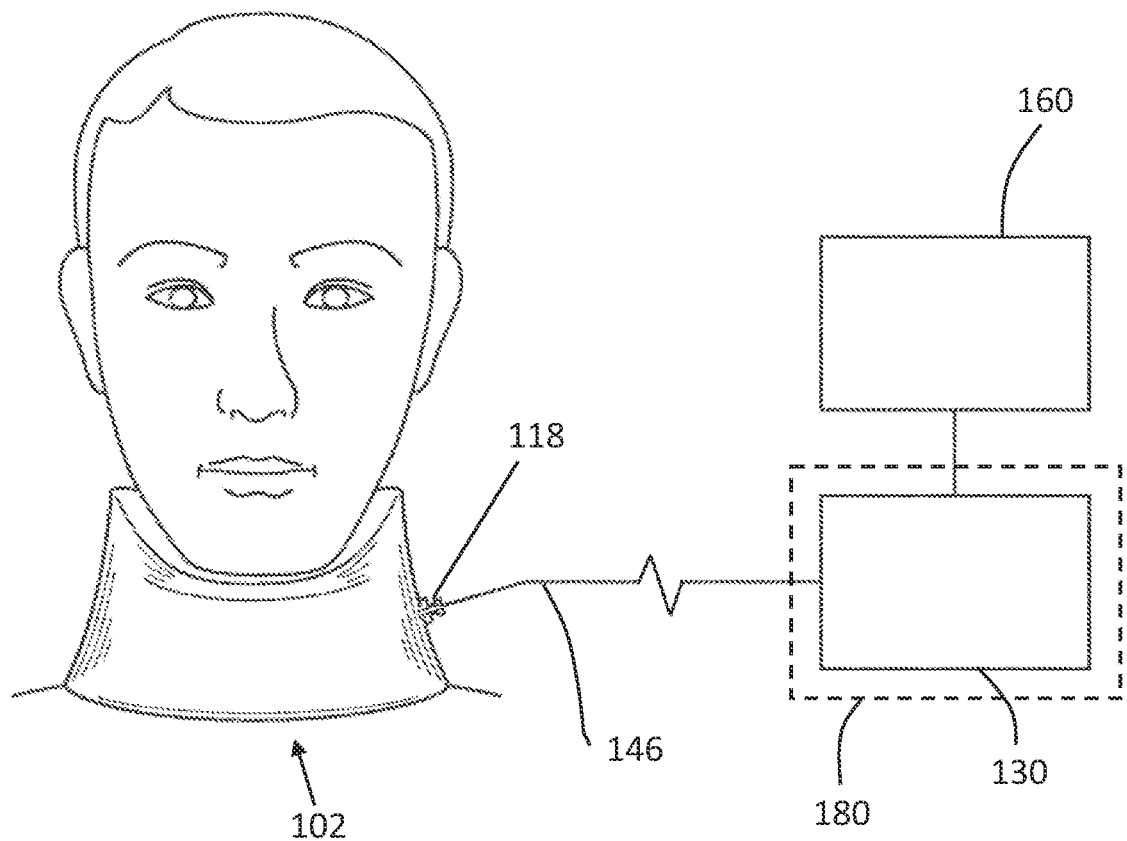
FIG. 2 is a representation of a system, according to an embodiment.

Referring to FIG. 2, an embodiment of system 100 is depicted, including a collar device 102, at least one pressure generator 130, and a programmer device 160. Collar device 102 is configured to be worn by a user, and may be worn around a neck of the user. Collar device 102 may be releasably connected to pressure (or flow) generator 130 such that the user can disconnect pressure generator 103 from collar device 102 if needed. Programmer 160 may be connected or connectable to one or more of collar device 102 and pressure generator 130. In embodiments, a carrier (e.g., a bag, backpack, tote or the like) 180 may optionally be included as part of system 100. Carrier 180 is intended to be worn or otherwise carried by a user of system 100 for ease of transportation between locations, for example, from a residence of the user to a hospital. Carrier 180 may be configured to receive and hold pressure generator 130 in a convenient, consolidated manner, and offer portability of system 100. In embodiments, carrier 180 may include a control or operation interface, in place of or in addition to, programmer 160.

Figure 3:
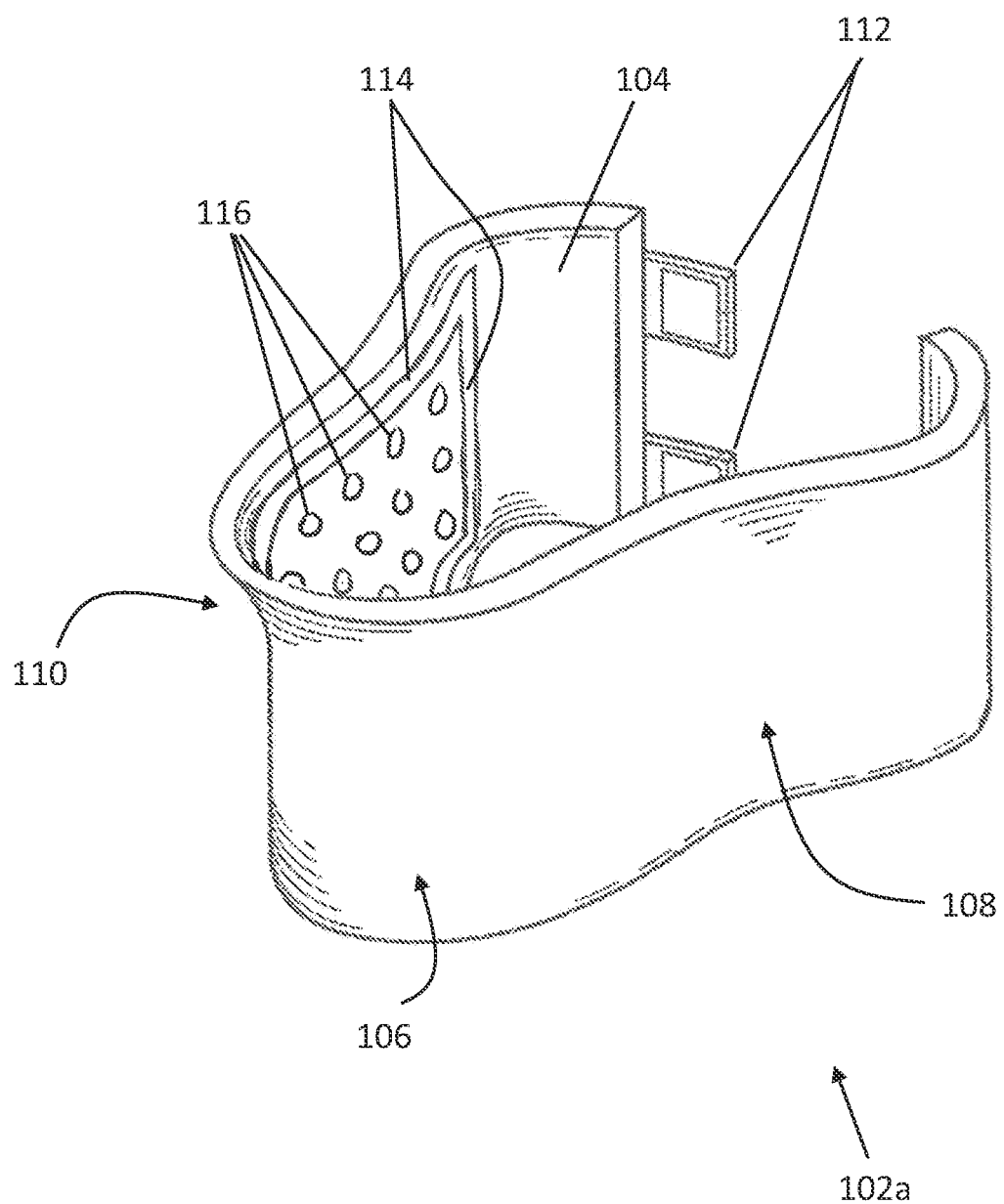
FIG. 3 is a perspective view of a collar device, according to an embodiment.

Referring now to FIG. 3, an embodiment of a collar device is depicted. Collar device 102a generally includes an inner side 104 configured to be worn against a neck of a user, an outer side 106 opposing inner side 104, and a left side 108 and a right side 110. Inner side 104 may comprise a membrane made from a polymeric material. Antimicrobial substances, including iodine, chlorhexidine, and antibiotics, may be incorporated into the membrane to minimize the risk of skin infection. Suitable materials for collar device 102a may include latex-type elastic material, silicone elastomers, shape-memory alloys and polymers, and other natural or synthetic materials. Additionally, collar device 102a may constructed from multiple materials, for example, a first relatively rigid material to serve as a framework for the device, and a second relatively pliable material for patient comfort.

A fastener arrangement 112 may be provided to selectively secure collar device 102a to a user. As depicted, fastener arrangement 112 is located at the rear of collar device 102a so as to be positionable posterior or dorsal on the user when worn. However, fastener arrangement 112 may be positioned at other locations as desired. Suitable types of fasteners include hook and loop, buckles, straps, clasps, ties, combinations thereof, or other such arrangements. Generally, fastener arrangement 112 may include one or more fastener elements configured to releasably couple the left side 108 of collar device 102a to the right side 110.

Collar device 102a further includes one or more seals 114 and one or more ports 116 disposed on inner side 104. As depicted in FIG. 3, collar device 102a includes a plurality or array of ports 116 arranged in a grid-like fashion on right side 110, with the understanding that although not pictured, left side 108 includes a similar or identical arrangement of ports 116 disposed on inner side 104. Other configurations of ports 116 are also contemplated. Each port 116 presents an open aperture. In embodiments, the diameter of each port 116 may be about twenty five millimeters or less; about twenty millimeters or less; about fifteen millimeters or less; about ten millimeters or less; or about five millimeters or less. Although ports 116 are depicted as having a generally circular shape, other shapes or configurations are also contemplated. In embodiments of collar device 102a including a plurality of ports 116, each port 116 may be sized and shaped similarly to other ports 116. In other embodiments, the shape, size, and arrangement of individual ports 116 may be varied.

Ports 116 are coupled with, or otherwise in communication with, pneumatic channels, conduits, or piping disposed within collar device 102. Ports 116 may be connected to such piping individually, and in embodiments may be individually actuatable or controllable. In other embodiments, ports 116 may be connected to such piping in common with one or more other ports 116. In embodiments, system 100 may include algorithms to cycle through and individually actuate one or more ports 116, obtain a patient physiologic response from each such actuation, and select one or more ports 116 to be used for further therapy or diagnostics, based on a desired or maximal baroreflex response. Algorithms may be programmed into system 100 via programmer device 160 and may be modifiable by the user or another individual as desired.

As depicted in FIG. 3, seal 114 may be arranged around a plurality of ports 116 on right side 110, with the understanding that although not pictured, left side 108 includes a similar or identical arrangement of seal 114 disposed on inner side 104. In another embodiment, a seal 114 may be provided for and arranged around each individual port 116. Seal 114 may be pliable and deformable, and suitable materials for seal 114 can include elastomers, latex-type, or other materials. In embodiments wherein collar device 102a is considered single use, seal 114 may also include an adhesive layer, which can be covered by a protective sheet and removed prior to use, similar to a bandage.

In embodiments wherein collar device 102a is configured only for application of negative pressure, collar device 102a may be self-affixing through the use of one or more of the ports 116, or one or more separate fixation-only ports (not pictured) configured to hold collar device 102a in place around the neck of a user under application of negative pressure. In embodiments wherein the applied pressure to ports 116 is pulsatile, the baseline applied pressure may be selected based on an amount sufficient to maintain fixation of collar device 102a on the user.

Collar device 102a may further include one or more connectors 118 for selectively coupling with pressure generator 130 or programmer device 160, as shown in FIG. 2. Connectors 118 may be fixedly attached to any location on outer side 106 though preferably on left side 108 or right side 110 to avoid entanglement with the user of collar device 102a. One of ordinary skill in the art would recognize that connectors 118 of various shapes and sizes are readily available in industry and would also possess the required knowledge to select a particular connector 118 design/configuration suitable for collar device 102a. For example, suitable configurations for connectors 118 may include pneumatic, electrical, electro-mechanical, or combinations thereof.

Figure 4:
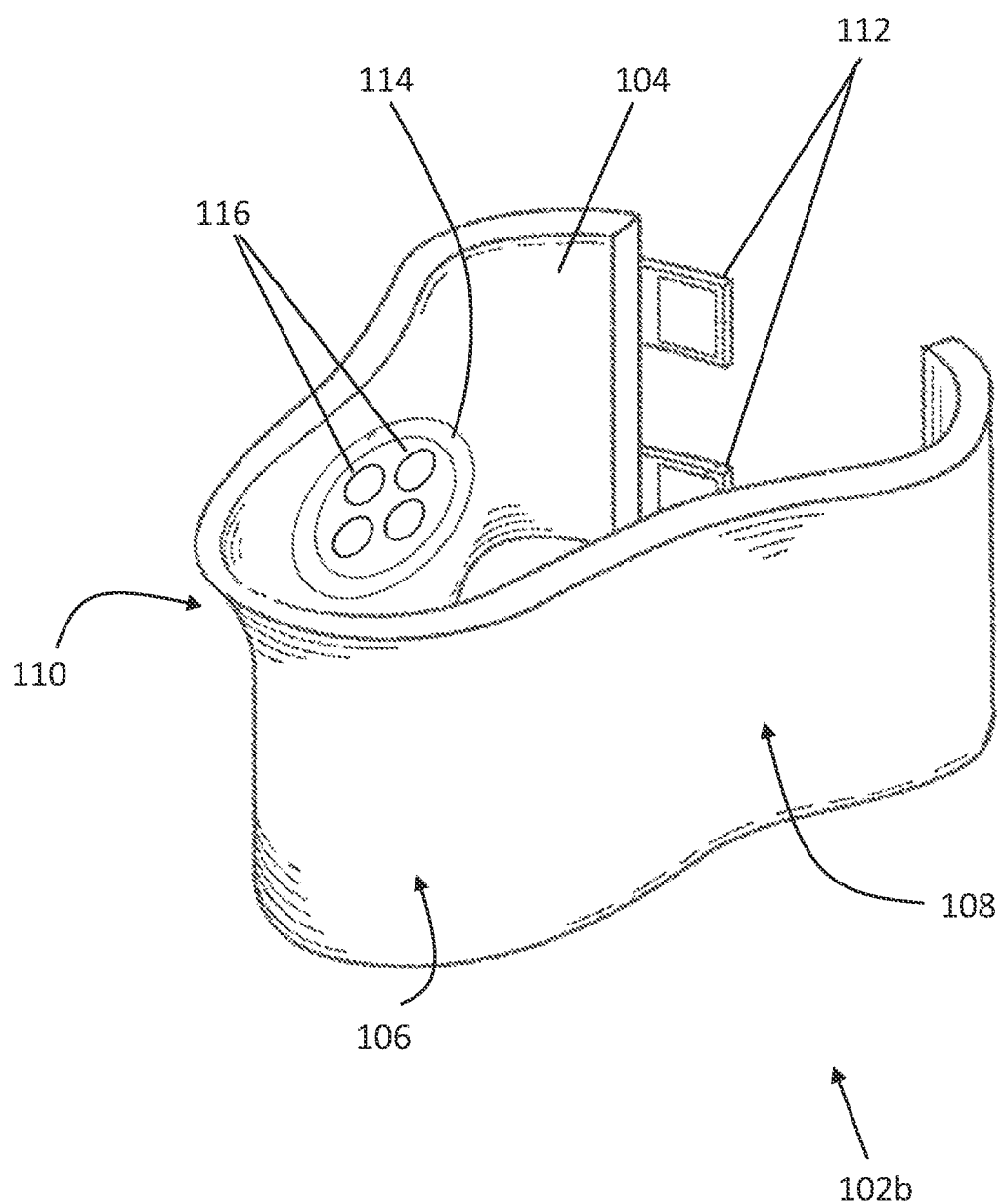
FIG. 4 is a perspective view of a collar device, according to another embodiment.

Referring now to FIG. 4, another embodiment of a collar device is depicted. Collar device 102b includes similarities to collar device 102a, and for simplicity the description of common components is not repeated in the following, and like numerals may designate like parts throughout that are corresponding or analogous.

Collar device 102b includes one or more seals 114 and one or ports 116 disposed on inner side 104. The location and arrangement of seals 114 and ports 116 may be targeted to correspond to a more focused area of a neck of a user, as compared to the larger array of ports in collar device 102a. The depiction of four ports 116 per side should be considered exemplary rather than limiting. And although not pictured, it will be understood left side 108 includes a similar, or identical, arrangement of ports 116 and seals 114 disposed on inner side 104 of collar device 102b.

In embodiments, collar devices disclosed herein may be configured to activate or deactivate aortic or pulmonary baroreceptors via application of negative or positive pressure proximate the supra-sternal notch. Such collar devices may be configured to extend over the supra-sternal notch of a wearer and allow application of pressure thereto so as to activate or deactivate aortic or pulmonary baroreceptors.

In embodiments, the collar devices disclosed herein may be operated so as to activate or deactivate carotid baroreceptors on a left side of a wearer, on a right side of a wearer, or both sides (bilateral), or aortic or pulmonary baroreceptors proximate the supra-sternal notch, or any combination of these locations, as desired.

Figure 5:
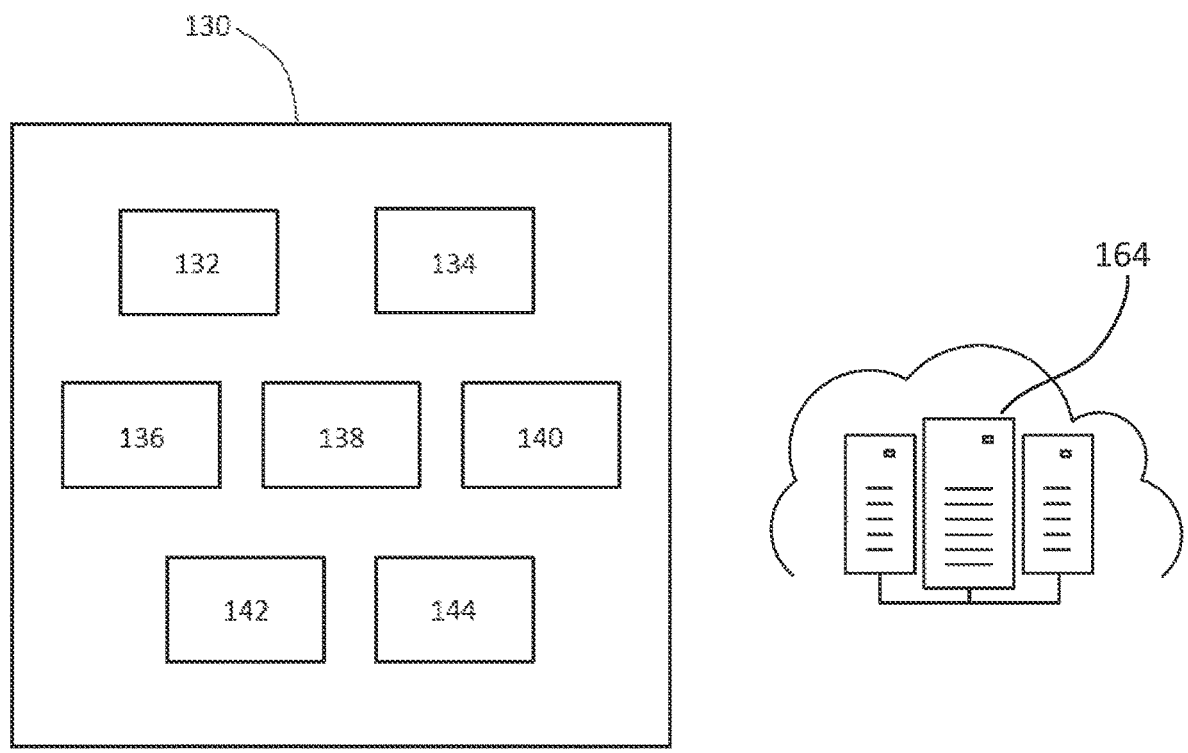
FIG. 5 is a schematic view of portions of a system, according to an embodiment.
Figure 5:
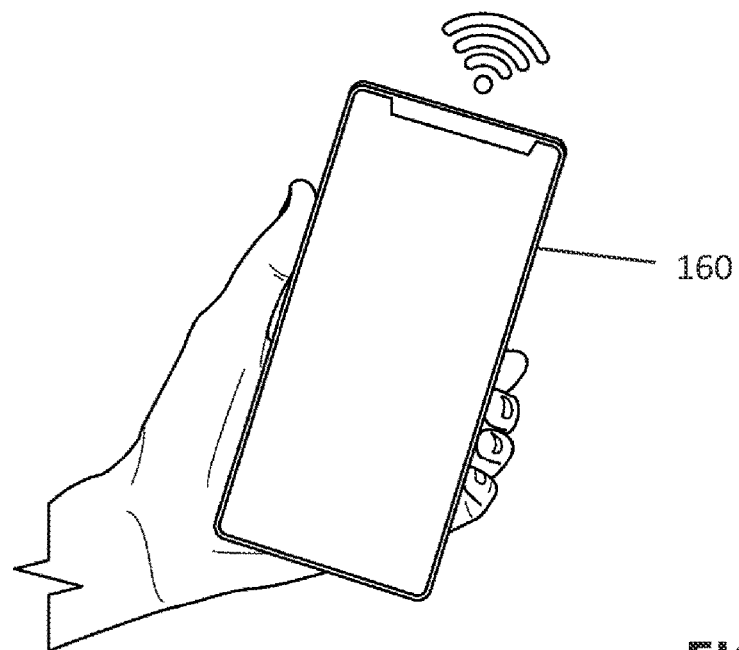

Referring now to FIGS. 2 and 5, in embodiments collar device 102 may be connectable to pressure generator 130 via link 146, which may comprise a pneumatic line. Link 146 may also include electrical wiring or cabling. In an embodiment, pressure generator 130 may include a pump 132, an optional tank 134, one or more operational sensors (e.g., pressure) 136, one or more valves 138, a control unit 140, a power source 142, and necessary associated pneumatic, electrical and mechanical connections. One or more components of pressure generator 130 may be contained in a housing. Power source 142 may be onboard pressure generator 130 in the form of a battery. In other embodiments, pressure generator 130 may be externally powered, such as from conventional residential or commercial power sources. In an embodiment, pressure generator 130 may include one or more telemetry links 144 for communicating with collar device 102 or programmer 160.

In embodiments, system 100 may be configured to limit operational noise. Pressure generator 130 may include noise insulation therein, for example lining the walls of the housing with an insulative material. Pneumatic conduits in one or more of pressure generator 130, link 144 and collar device 102 may include acoustical insulative overlays, absorptive materials within the conduits (e.g., baffles or diffusers), and resonators within the airflow path. In embodiments, system 100 may be configured for active noise cancellation and include one or more transducers at or near the user, emitting inverted-phase airflow noise as sampled from the ambient environment.

In embodiments, pressure generator 130 may be configured to provide both negative pressure and positive pressure. In an embodiment, pressure generator 130 may be capable of pressures of about +/−100 mmHg. More particularly, in embodiments, pressure generator 130 may be capable of pressures of about +50 mmHg to −80 mmHg. In embodiments, pressure generator 130 may be configured to provide constant flow or pulsatile flow.

Programmer 160 may be a mobile cellular device, desktop computer, laptop, tablet, smart watch or other wearable, dedicated programming device, or combinations thereof. Programmer 160 includes a user interface such as touchscreen or keypad. Programmer 160 may be configured to wirelessly communicate with one or more of pressure generator 130 or collar device 102, or may be physically connected by one or more cables. In embodiments, programmer 160 can be configured to transmit programming data or instructions to one or more of pressure generator 130 or collar device 102. In embodiments, programmer 160 can be configured to receive data (e.g., device operational data, feedback from sensors, diagnostics data, therapeutic delivery data, efficacy data, optimal positioning of the pressure application over carotid artery, etc.) from one or more of pressure generator 130 or collar device 102. In an embodiment, programmer 160 can be configured to receive data suitable to construct a sigmoid relation, similar to that depicted in FIG. 1A, wherein the x-axis represents pressure applied from pressure generator 130, and the y-axis represents a patient physiological parameter such as heart rate, R-R interval, P-P interval, blood pressure, or other such parameter. In embodiments, one or more of pressure generator 130 or programmer 160 may be configured to directly interface with hospital monitoring devices, via proprietary connections optionally, for the purpose of receiving patient or other data.

In some embodiments, the data collected may be sent to the user via the user interface. Diagnostic data may include real-time blood pressure or heart rate readings. These metrics may then inform the therapy delivered, producing therapeutic delivery data. Each sequence of events in the user of the collar device 102 may produce data to initiate the next step in treatment or diagnosis. At the conclusion of use, efficacy data may be produced to illustrate how the device is functioning, and whether the pressure generator 130 of the collar device 102 must be adjusted via the programming device 160, or other therapy parameters adjusted.

In some embodiments, data communicated between the external programming device 160 and one or more of pressure generator 130 or collar device 102 can be transmitted to an optional external server 164 for analysis, storage, wider dissemination, or similar. In some embodiments, the external server 164 can be configured as a network of servers and/or a computing cloud. For example, in some embodiments, the external server 164 can include one or more complex algorithms representing machine learning and/or a neural network configured to process and analyze data to further improve patient outcomes. In embodiments, data from one or more of programming device 160 and server 164 may be communicable with, or accessible by, a clinician.

Figure 6:
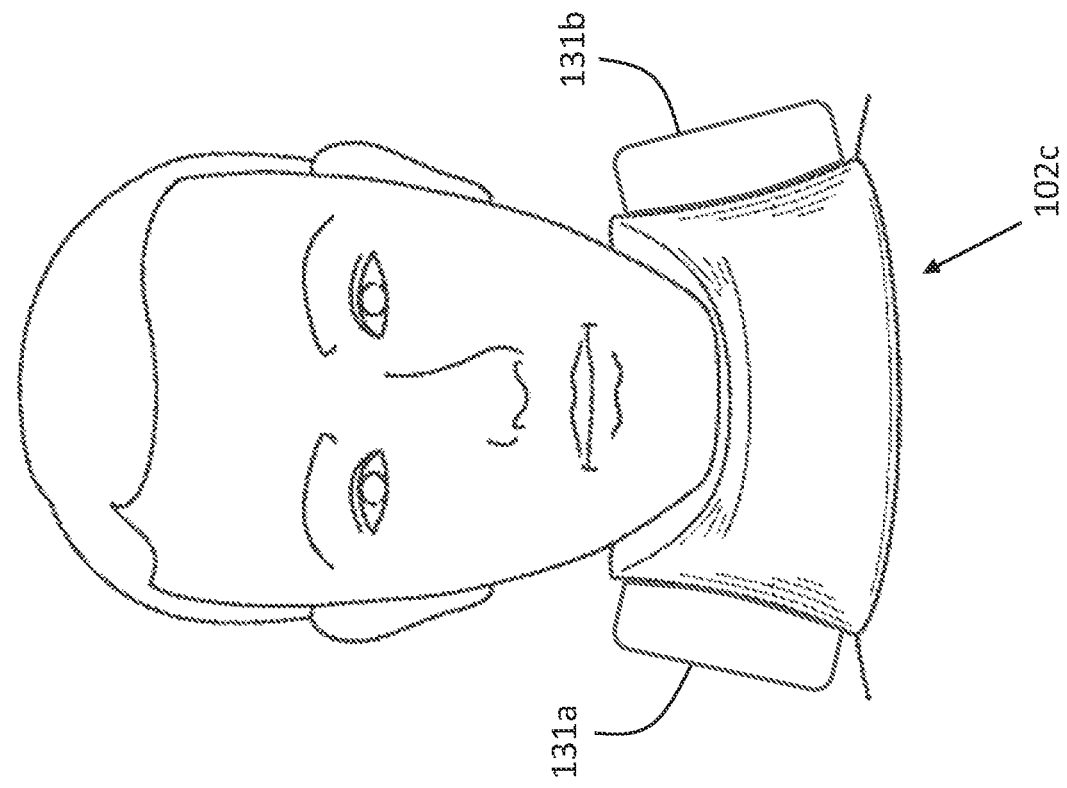
FIG. 6 is a front elevation view of a collar device, according to another embodiment.
Figure 6:
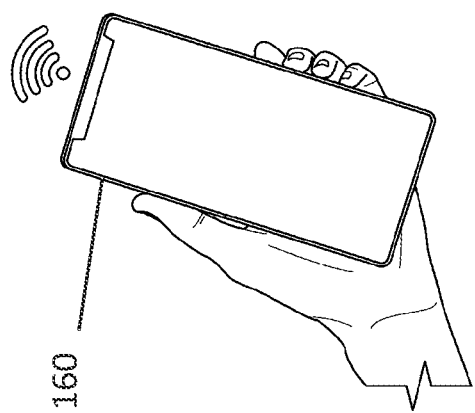

Referring now to FIG. 6, another embodiment of a collar device is depicted. Collar device 102c includes similarities to collar device 102a, and for simplicity the description of common components is not repeated in the following, and like numerals may designate like parts throughout that are corresponding or analogous. Collar device 102c includes a plurality of housings 131a, 131b integrated with collar device 102c. In an embodiment, each of housings 131a, 131b comprise a miniaturized pressure generator similar in concept to pressure generator 130 described previously. In another embodiment one of housings 131a, 131b includes an air pump and related components, while the other housing includes the power source, controller, telemetry and related components, wherein housings 131a, 131b are operably linked via collar device 102c.

Although depicted with two integrated housings, greater or fewer are also contemplated. Collar device 102c provides a fully portable arrangement which may be advantageous for some applications. Collar device 102c may be communicable with and controllable by programmer 160. Between uses, collar device 102c may be removed to allow recharging of the power source. Collar device 102c may also be configured to be coupled with auxiliary power during use to extend operation time.

Figure 7:
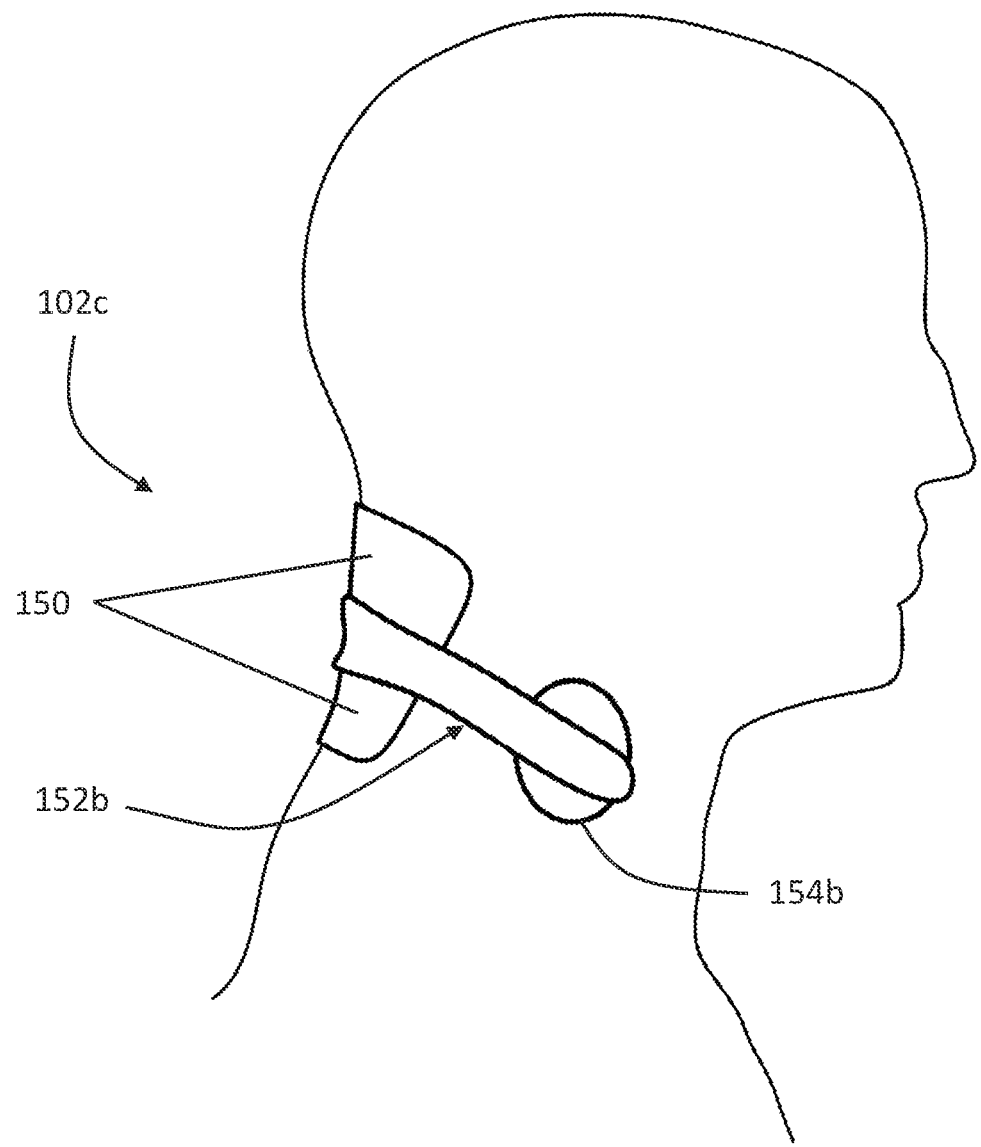
FIG. 7 is a side elevation view of a collar device, according to another embodiment.

Referring now to FIG. 7, another embodiment of a collar device is depicted. Collar device 102d includes similarities to collar device 102c, and for simplicity the description of common components is not repeated in the following, and like numerals may designate like parts throughout that are corresponding or analogous. Collar device 102d is configured as a band-like device which when worn, is arranged on the rear and sides of a neck of the wearer. Collar device 102d comprises a housing portion 150, left and right beams (or bars) 152a,b, and cups 154a,b disposed on the end of respective beams 152a,b. FIG. 7 is a right side elevation view and although not pictured, it will be understood the left side of collar device 102d includes a similar, or identical, arrangement of beam 152b and cup 154b. As depicted in FIG. 7, collar device 102d is configured to extend only partially around a circumference of a neck of the wearer, although other configurations are contemplated such as fully encircling the neck of the wearer.

Housing 150 can include a miniaturized pressure generator similar in concept to pressure generator 130 described previously, with an air pump and related components, a power source, controller, telemetry and related components. In other embodiments, housing 150 may comprise multiple sub-structures, with the components of the miniaturized pressure generator distributed among the sub-structures. In another embodiment collar device 102d may omit an onboard integrated pressure generator, and instead be coupled via link 146 to pressure generator 130.

Each of cups 154a,b can include one or more ports 116 as described previously, as well as one or more seals 114. Collar device 102d is configured to be placed on a neck of a user, such that cups 154a,b are positioned proximate a carotid sinus of the user.

Collar device 102d may be size adjustable to fit a variety of patients. For example, beams 152a,b may incorporate a slider element to adjust the length of beams 152a,b anteriorly or posteriorly. Further, beams 152a,b may include biased hinges (similar to those used in eyeglass bows) to allow for adjustment laterally and medially, as well as to urge cups 154a,b against the neck of the wearer.

In embodiments, collar device 102d provides a fully portable arrangement which may be advantageous for some applications. Collar device 102d may be communicable with and controllable by programmer 160. Between uses, collar device 102d may be removed to allow recharging of the power source. Collar device 102d may also be configured to be coupled with auxiliary power during use to extend operation time.

Figure 8:
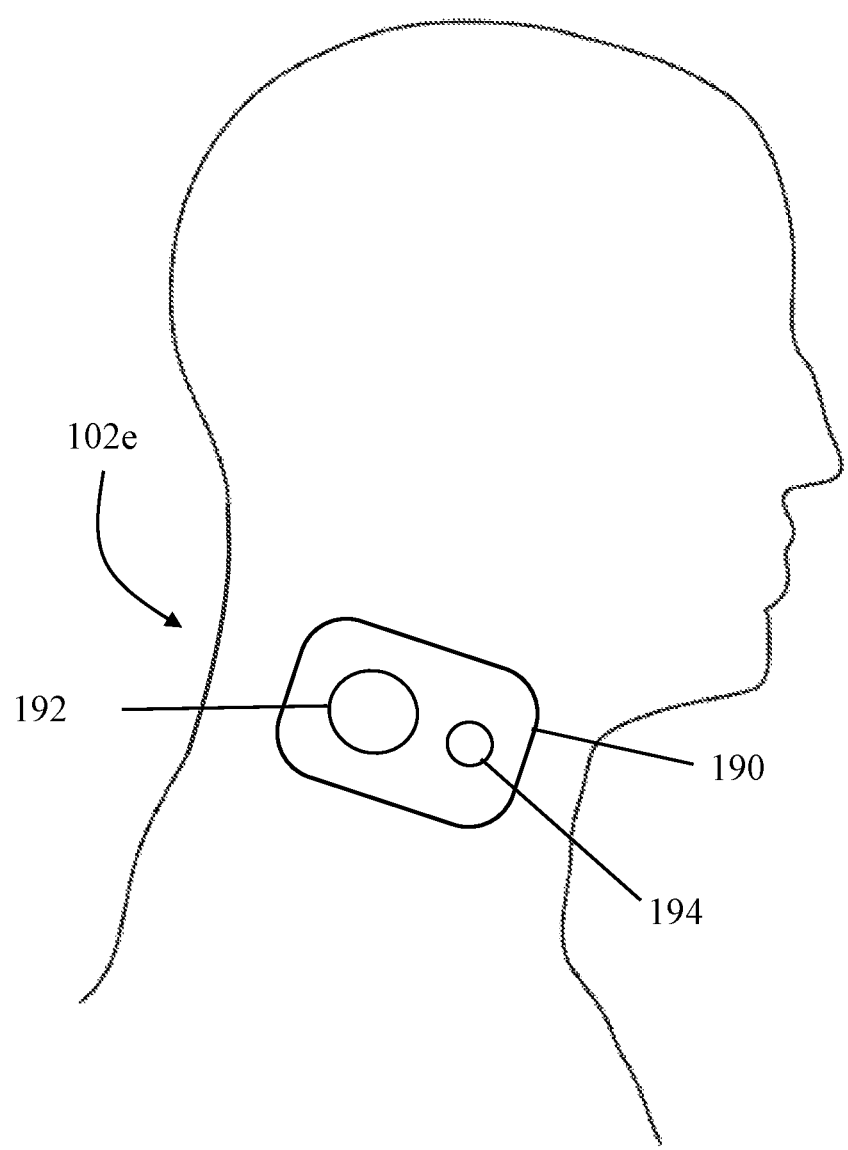
FIG. 8 is a side elevation view of a neck device, according to another embodiment.

Referring now to FIG. 8, another embodiment of a collar or neck device is depicted. Neck device 102e comprises a patch 190, including a pump assembly 192 and release valve 194. In an embodiment, neck device 102e may be single-use, e.g., disposable. Patch 190 may include appropriate adhesive for temporary securement to a wearer, for example adhesive arranged around a perimeter of patch 190, wherein the adhesive is configured to create a sealed chamber between neck device 102e and the wearer.

Pump assembly 192 may be manually operable to create a negative pressure between patch 190 and the wearer, and pump assembly 192 may comprise a squeezable membrane. Neck device 102e can include a conduit or pathway between pump assembly 192 and the side of patch 190 arranged against the skin of the wearer, such that operation of pump assembly 192 (e.g., by repeated squeezing), creates a negative pressure between neck device 102e and the wearer. As with other embodiments described herein, application of negative pressure on a carotid sinus region of a patient's neck may be utilized for diagnostic or therapeutic applications, or combinations thereof.

In an embodiment, neck device 102e may include a pressure limiting mechanism configured to limit a level of negative pressure created by pump assembly 192. In an embodiment, neck device 102e may include a sensor or other means for indicating a pressure measurement. Upon completion of the desired use of neck device 102e, release valve 194 is operable to release the applied negative pressure, allowing removal of neck device 102e.

In embodiments, the collar devices described herein may be configured for single use, and then disposed of or cleaned for subsequent uses. In other embodiments, the collar devices described herein may be for chronic use by a single user, for example as part of a home treatment or diagnosis.

In other embodiments, the collar devices described herein may include one or more disposable hygienic liners, which can be removed or replaced between uses.

Although described herein as a collar device, in alternate embodiments, aspects of the present disclosure can be utilized with other devices such as: a modified cervical collar; a box-like enclosure which can apply pressures to the entirety of the neck or a portion thereof; or a mechanical assembly to lock the device in place (similar to a springform pan) which allows fixation of an active pressure chamber to appropriate regions of a user's neck. Further, the depicted embodiments of collar devices should be considered exemplary rather than limiting; other shapes, sizes and configurations of such devices are also contemplated and within the scope of the present disclosure.

In embodiments, collar device 102 may include a variety of sensors 120 (not pictured), for diagnostic or control purposes, to improve patient outcomes. For example, sensor 120 may comprise a pressure transducer to measure pressure applied to the neck. In embodiments, the pressure transducer may be arranged on inner side 104, for example within the boundary defined by seal 114. In embodiments, the pressure transducer may be arranged in one or more of the pneumatic conduits in collar device 102, and optionally proximate connector 118.

In other embodiments, sensor 120 may comprise a temperature sensor. In embodiments, the temperature sensor may be arranged in one or more of the pneumatic conduits in collar device 102, and optionally proximate connector 118. In embodiments, the temperature sensor may be arranged on inner side 104, for example within the boundary defined by seal 114. In further embodiments, sensor 120 may comprise a humidity sensor. The humidity sensor may be arranged in one or more of the pneumatic conduits in collar device 102, and optionally proximate connector 118. In embodiments, the humidity sensor may be arranged on inner side 104, for example within the boundary defined by seal 114.

In embodiments, use of sensors may allow for automatic therapeutic adjustments to be made. For example, if a patient is receiving treatment via the collar device 102 to aid in the regulation of hypertension, sensor 120 may detect an increase in heart rate or blood pressure. Once the sensor 120 receives data indicating an increase in heart rate of blood pressure, the programming device 160 may send data to the pressure generator 130 to apply negative pressure to the neck, thus causing a decrease in heart rate and blood pressure.

In embodiments, sensor 120 may comprise one or more physiologic sensors, for example an optical or acoustic heart rate sensor. In embodiments, the physiologic sensor may comprise one or more electrodes to measure electrocardiograms. In embodiments, the physiologic sensor may comprise an ultrasonic sensor for assessing carotid artery flow. In embodiments, the physiologic sensor may comprise a tonometer for measuring the carotid pressure waveform. In embodiments, the physiologic sensor may comprise an impedance sensor for measuring respiratory rate or carotid artery hemodynamics. The one or more physiologic sensors may be arranged on inner side 104 of collar device 102, or other suitable location.

In embodiments, system 100 may be communicable with one or more auxiliary sensors 170. For example, an auxiliary sensor 170 can be worn by the patient, such as a smart watch, wristband fitness tracker, sensors embedded in clothing, and the like. Auxiliary sensor 170 may comprise a heart rate monitor, pulse oximeter, respiratory sensor, perspiration sensor, posture orientation sensor, motion sensor, accelerometer, microphone, or electromyographic (EMG) sensor, among others.

In embodiments, auxiliary sensor 170 may comprise an implanted sensor configured to measure blood pressure, blood flow, blood flow velocity, nerve traffic activity, or other parameters of interest. Such an implanted sensor may be positioned in or on the heart, in or on an artery or vein, or on or proximate nerve tissue. Implantable sensors may be communicable with one or more of collar device 102, control unit 140, or programmer 160, such as by radiofrequency telemetry.

Data from the one or more sensors 120, or auxiliary sensors 170, may be communicated with control unit 140 or programmer 160. In embodiments, operation of system 100 may be modified based on data from one or more sensors 120 or auxiliary sensors 170.

In embodiments, system 100 may be communicable with one or more implanted or external devices, for example cardiac rhythm management devices, so as to coordinate function of system 100 with such implanted or external devices. Such communication may be radiofrequency, Bluetooth, or other suitable means. In an embodiment, system 100 may be combined with or integrated with an external defibrillator.

In operation, system 100 may be configured for external application of positive or negative pressure on a carotid sinus region of a patient's neck, for diagnostic or therapeutic applications, or combinations thereof. For example, external application of negative pressure to the neck may stimulate or activate baroreceptors, resulting in decreases in heart rate and blood pressure. Conversely, external application of positive pressure to the neck may result in an increase in heart rate and blood pressure.

In an embodiment, operation of system 100 may be as follows. Collar device 102 is placed on a neck of a user, such that one or more ports 116 are positioned proximate a carotid sinus of the user. The fit and placement of collar device 102 is confirmed, the collar is then secured with fastener arrangement 112. Appropriate connection is made with pressure generator 130, for example by coupling link 146 with connector 118 on collar device 102. Pressure generator 130 and programmer 160 are each powered on, and a desired regimen (e.g., diagnostic, therapeutic, etc.) is selected using programmer 160.

During operation, control unit 140 of pressure generator 130 causes an output of negative or positive pressure to be delivered to collar device 102, according to a desired regimen or protocol which may be stored in memory associated with control unit 140, or which may be received as instructions from programmer 160. In embodiments, the pressure output delivered from pressure generator 130 may be constant, pulsatile, series of pulses, bursts, periodic, triggered, or combinations thereof. In embodiments, the pressure delivered from pressure generator 130 may be monophasic, such as only negative pressure or only positive pressure. In other embodiments, the pressure output delivered from pressure generator 130 may be biphasic, for example a positive pressure output followed by a negative pressure output or a negative pressure output followed by a positive pressure output. In embodiments, the pressure output of pressure generator 130 may comprise a waveform. In embodiments, the waveform may be symmetric or asymmetric.

The pressure output of pressure generator 130 may include a number of characteristics which can be modified or changed, individually or in combination, to alter the output as desired. Such characteristics can include amplitude, duration, frequency, polarity (positive or negative), among others. In embodiments, the range of pressure output amplitude may be about +/−100 mmHg. More particularly, in embodiments, the range of pressure output amplitude may be about +50 mmHg to −80 mmHg. In embodiments, the range of pressure output frequency may be sufficient to coincide with specific cardiac events.

Transitions between different output states (e.g., from non-operational to delivering a pressure output, or from delivering an output of a first polarity to an output of a second polarity) may feature a consistent slew profile. In embodiments, output transitions may be linear, sigmoidal, or step changes. In embodiments, the rate of change of output transitions may be up to 5000 mmHg/s.

In embodiments, system 100 may operate in open loop or closed loop modes. Control unit 140, or memory associated therewith, may include software containing one or more algorithms defining one or more functions or relationships between the sensor signal and the output signal (pressure). The algorithm may dictate activation or deactivation control signals depending on the sensor signal or a mathematical derivative thereof. The algorithm may dictate an activation or deactivation control signal when the sensor signal falls below a lower predetermined threshold value, rises above an upper predetermined threshold value or when the sensor signal indicates a specific physiologic event.

Closed loop operation of system 100 may include a manual override. For example, cessation of closed loop operation may be important in the event that a physiologic sensor is compromised or if conditions arise when manual coordination of therapy becomes important (e.g., during specific events such as percutaneous coronary intervention for example). In an embodiment, programmer 160 may be configured to override closed loop operation. In an embodiment, control unit 140 may be configured to be operable to override closed loop operation. In an embodiment, one or more sensors 120 may be used with closed loop operation of system 100 to assess patient status and deliver appropriate positive or negative pressure to alleviate patient symptoms.

In an embodiment of open loop operation, programmer 160 may display one or more operating parameters of system 100 via a user interface, allowing a user or clinician to modify one or more parameters. Examples of parameters adjustable using programmer 160 may include output amplitude, duration, frequency, or polarity.

In embodiments, system 100 may be calibrated to a user prior to operation. For example, a series of pressures can be applied by collar device 102 to the user, and one or more physiologic responses are measured. The range of applied pressures may be predetermined, or randomly generated. Measured physiologic responses can be determined from external sensors or from sensors included as part of system 100, and can include R-R intervals, fingertip pressure, central pressure, vascular resistance, or others.

In embodiments, system 100 may be used for a number of diagnostic purposes, including to assess baroreflex function, to determine suitability for a chronically implanted baroreflex activation device, or to compare response efficacy between the left carotid sinus and right carotid sinus of a patient, among others. For example system 100 may be utilized by a clinician as part of regular patient checkups to measure and record a patient's baroflex function over time as an indicator of patient health. In embodiments, a patient can utilize system 100 to self-test baroreflex function, such as by running a pre-programmed test on a periodic basis (daily, weekly, etc). The results of the self-test may be used by the patient to adjust any delivered therapies, or may be logged and communicated to one or more of programmer device 160 or server 164, for inspection by a clinician to tailor any prescribed therapies (such as pharmaceutical, or with system 100, or other) or otherwise monitor and assess patient health or disease progression. In embodiments, baroreflex function is calculated using a microprocessor (not pictured) disposed within system 100 having custom algorithms configured to allow calculation in both time and frequency domains.

In embodiments, one or more thresholds may be associated with baroreflex function measured with system 100, such that a first treatment is prescribed or maintained for a value above a threshold, while a second treatment is prescribed or maintained for a value below a threshold.

In embodiments, system 100 may be used to assess baroreflex function for patients with borderline hypertension as part of a determination to begin, pause, or otherwise modify a therapeutic treatment for hypertension. In embodiments, system 100 may be used to assess Zbaroreflex function for prehypertensive diabetic patients as part of a determination to begin, pause, or otherwise modify a therapeutic treatment.

In embodiments, system 100 may be used to determine suitability of a patient to receive a chronically implanted baroreflex activation device, based on whether baroreflex activation stimulus delivered from system 100 created a desired or favorable response. Such a determination may further include determining one or more locations in the patient's body in which to place the implantable device. In an embodiment, for example, determining the one or more locations comprises determining whether to place the implantable device in a left side and/or a right side of the patient's neck based on a measured response to stimulation delivered by system 100 individually to the left and right sides. For example, if stimulation delivered to the right side of a patient provides a better response than to the left, the right side could be chosen.

In embodiments, system 100 may be used for a number of therapeutic purposes to treat a variety of conditions, such as arrhythmias, myocardial infarctions, hypertension, coronary disease, kidney disease, epilepsy, preeclampsia, erectile dysfunction, chronic pain, migraine, orthostatic hypertension, inflammation and many others which can be targeted through modulation of the sympathetic and parasympathetic nervous systems. In embodiments therapy sessions may be twice daily, daily, alternating days, or other desired schedule. A therapy session may have a duration from about five minutes up to about fifteen minutes, although shorter and longer therapy sessions are contemplated. System 100 may be used in the comfort of a user's home, or at a clinic or hospital.

In embodiments, aspects of the present disclosure can be used to deliver therapy to treat one or more of the below disease conditions, by activating or deactivating the baroreflex through the use of negative or positive pressure on the neck of the patient. In embodiments, system 100 may be configured to detect one or more patient conditions with sensors 120, and deliver an appropriate therapy via a programmer device 160. Appropriate therapy may be altered or personalized via a user interface, by the user themselves, or by a clinician or third-party.

| ACUTE | CHRONIC |
|---|---|
| Guide right vs left implant of baroreflex activation device | |
| Arrhythmia suppression (atrial fibrillation, supraventricular tachycardia, premature ventricular contractions, ventricular tachycardia) | Modify arrhythmia substrate, reduce cardiac inflammation |
| Preservation of cardiac muscle during acute myocardial infarction, prevent future heart failure, terminate angina episodes | Post myocardial infarction to restore sympatho-vagal balance |
| Improve pulmonary congestion associated with acute decompensated heart failure or any condition resulting from elevated pulmonary capillary pressures | Pulmonary hypertension, reduce central venous pressure to unload right ventricle/pulmonary hypertension |
| Differentiation ischemic vs obstructive coronary disease in determination of coronary artery disease treatment (similar to FFR/IVUS/CT assessment) | |
| Reduce blood pressure during hypertensive crisis | Reduce sympathetic tone to arteries to reduce arterial stiffness; reduce cerebral pulsatility/plaque burden for application to Alzheimer's disease and/or dementia |
| Preserve renal function during dialysis and volatility of blood pressure | Chronic kidney disease to stabilize glomerular filtration rate |
| Termination of epileptic seizure | Treatment to suppress future epileptic episodes |
| Reduce cerebral blood pressure during stroke | Reduce blood pressure associated with pregnancy (preeclampsia) and post-partum hypertension |
| During Impella or other short term cardiac assist device, further reduce myocardial oxygen demand during high risk percutaneous coronary intervention or cardiogenic shock | Restore 'pulsatility' to left ventricular assist device patients and improve vascular hemodynamics, GI hypertension |
| Military application battlefield hemorrhage/shock | Septic shock in intensive care unit |
| | Improvement of sleep cycle, insomnia |
| | Relief and amelioration in peripheral artery disease; reduce inflammation in peripheral tissues associated with sympathetic withdrawal |
| | Blunting chronic pain sensation |
| | Concomitant use with continuous glucose monitors to reduce blood glucose and type II diabetes symptoms |
| | Reduce state of arousal/stress, relief of depression/chronic fatigue, long COVID syndrome |
| Restoration of pressure resulting from erectile drug use | Improve erectile dysfunction |
| Improve symptoms associated with postural tachycardic syndrome (POTS) | Treat autonomic dystonia |
| Lymph flow regulation in the peripheral and cerebral circulations | |
| Reduce cardiac pressures and improve venous return in patients with Fontan procedure | Reduce cardiac pressures and improve venous return in patients with Fontan procedure |

In one embodiment, system 100 may treat an acute condition, such as the termination of an epileptic seizure. Seizures typically activate sympathetic nervous activity and higher brain centers, increasing the heart rate and blood pressure. To respond to an epileptic seizure, collar device 102 may apply negative pressure to the neck of the user, lowering the heart rate and blood pressure of the user, and targeting the higher brain centers which are responsible for "sleeping" effect and activating parasympathetic nervous activity to terminate the seizure.

In another embodiment, system 100 may be used to treat chronic conditions, such as suppressing future epileptic episodes. System 100 may store data from previously treated epileptic episodes, and have a saved treatment protocol or plan. Using one or more sensors 120, the collar device 102 will detect a change in blood pressure or heart rate. Upon sensing this increase, sensor 120 will send feedback to programmer device 160, initiating treatment of the epileptic episode. Clinicians and users may alter or personalize the treatment offered by the collar device 102, using a user interface, with the treatment being received by programmer device 160.

In another embodiment, system 100 may be used acutely to reduce blood pressure during a hypertensive crisis. Carotid baroreflex activation therapy may produce a sustained fall in blood pressure in patients with resistant hypertension. In another embodiment, system 100 may aid in the treatment of chronic conditions, such as reducing sympathetic tone to arteries to reduce arterial stiffness. Natural activation of the baroreceptors by increased pressure may lead to suppression of central sympathetic outflow. Further, chronic stimulation of carotid baroreceptors may have a lasting effect on the reduction of sympathetic activation. Baroreflex activation may be accompanied by favorable effects on cardiac function and clinical profile.

In another embodiment, system 100 may be used acutely to reduce cerebral blood pressure during stroke. System 100 functions in a similar nature to the above example. Lowering cerebral blood pressure may also be advantageous for the purposes of reducing blood pressure associated with pregnancy (preeclampsia) and post-partum hypertension. The sensors 120 in collar device 102 may detect a rise in blood pressure, and communicate with programmer device 160 to begin treatment. For the acute treatment of reducing cerebral blood pressure, collar device 102 may be worn only once, for a 10-15 minute session to deliver adequate treatment. For chronic treatment, such as reducing blood pressure associated with preeclampsia, collar device 102 may be worn for several sessions, for 10-15 minutes at a time. Treatment may take place over the course of a few weeks, or a few months, depending on the patient's condition.

In another embodiment, further acute treatments may include guiding right vs left implant of baroreflex activation device. The collar device 102 may optimize the placement of the baroreflex activation device, with the use of sensors, diagnostics, and other data. In another embodiment of an acute use, the system 100 may help differentiate ischemic versus obstructive coronary disease in the determination of coronary artery disease treatment. This analysis is similar to a fractional flow reserve, intravascular ultrasound, or computed tomography assessment. Treatment of coronary artery disease often requires surgical intervention, but less progressed cases and more specific identification of the coronary disease may benefit from blood pressure reducing treatments using collar device 102. Specifically, if system 100 is used to diagnose ischemic coronary artery disease, collar device 102 may provide treatment while a patient is still asymptomatic, and before they would have gone to the doctor or hospital. This may be seen in users who are being treated for other conditions using collar device 102.

In another embodiment, system 100 may aid in the treatment and suppression of arrhythmias. Baroreflex activation therapy, using collar device 102 may replace conventional therapies, because by reducing central sympathetic outflow, and myocardial automaticity cardiac workload is reduced, as well as myocardial oxygen consumption. In addition, restoring autonomic balance may produce beneficial arrhythmia suppression for future episodes, reducing or all together removing requirements for future medical treatment, or a permanent pacemaker.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for modulating autonomic nervous system activity in a patient, comprising:
   positioning a wearable collar device externally on the neck of the patient, such that one or more pressure ports are aligned with a carotid sinus region;
   delivering a baroreflex activation regimen to the patient using the wearable collar device, wherein the regimen comprises application of pneumatic pressure through the pressure ports; and
   modifying autonomic nervous system function by selectively activating or deactivating baroreceptors via controlled external mechanical stimulation.

2. The method of claim 1, wherein the baroreflex activation regimen comprises application of external positive or negative pneumatic pressure, generated by an integrated pressure generator.

3. The method of claim 2, wherein the integrated pressure generator comprises a miniaturized pump assembly and control unit housed within the wearable collar device, configured to deliver pneumatic pressure locally without requiring external tubing or separate hardware.

4. The method of claim 1, wherein the wearable collar device includes a plurality of independently actuatable pressure ports, each pressure port in communication with a dedicated conduit and valve, configured to map and deliver the baroreflex activation regimen based on differential patient response.

5. The method of claim 1, wherein the wearable collar device includes a left-side pressure port and a right-side pressure port, each independently controllable to deliver unilateral or bilateral stimulation to the carotid sinus region.

6. The method of claim 1, further comprising recording a physiological response to the applied pressure to assess baroreflex function, including baroreflex sensitivity and gain.

7. The method of claim 6, further comprising generating a lateralized baroreflex response map to identify optimal stimulation parameters based on side-specific autonomic responses.

8. The method of claim 1, wherein the baroreflex activation regimen includes delivery of graded pressure stimuli at multiple predefined intensities to generate a dose-response profile.

9. The method of claim 1, wherein the method is used to deliver therapeutic modulation for a disease state characterized by sympathetic overactivity or parasympathetic underactivity.

10. The method of claim 9, wherein the disease condition comprises one or more of: resistant hypertension, systolic or diastolic heart failure, pulmonary hypertension, epilepsy, migraine, chronic pain syndrome, major depressive disorder, cardiac arrhythmia, or systemic inflammatory conditions.

11. The method of claim 1, wherein the baroreflex activation regimen is delivered to a patient undergoing dialysis to stabilize blood pressure fluctuations and reduce dialysis-associated symptoms.

12. The method of claim 1, wherein the baroreflex activation regimen is delivered to a patient with acute decompensated heart failure to improve pulmonary congestion and stability circulatory function.

13. The method of claim 1, further comprising measuring a physiological parameter in response to the baroreflex activation regimen using one or more onboard or auxiliary sensors.

14. The method of claim 13, wherein the physiological parameter comprises one or more of: arterial blood pressure, heart rate, heart rate variability, cardiac output, vascular resistance, respiratory rate, seizure activity, or autonomic tone indices.

15. The method of claim 13, further comprising dynamically adjusting the baroreflex activation regimen in real time in response to the measured physiological parameter.

16. The method of claim 1, wherein the wearable device includes at least one biosensor configured to detect changes in autonomic nervous system function, and further comprising storing biosensor data in a local or remote memory storage device for review or clinical interpretation and wirelessly transmitting the data to a clinician interface, electronic health record system, or remote monitoring server.

17. The method of claim 1, wherein the wearable device includes a programmable controller configured to operate the device in a closed loop control mode, and wherein the closed loop control mode includes modifying the pressure delivery pattern based on real-time feedback from one or more physiological sensors.

18. The method of claim 1, wherein the baroreflex activation regimen comprises delivery of pressure waveforms selected from continuous, pulsatile, or alternating sequences of positive and negative pressures.

* * * * *